United States Patent [19]
Offer et al.

[11] Patent Number: 5,981,897
[45] Date of Patent: Nov. 9, 1999

[54] APPARATUS FOR DISTRIBUTING COVER GAS IN REDUCED-WIDTH GROOVE DURING WELDING

[75] Inventors: Henry Peter Offer, Los Gatos, Calif.; Benedict Kazirskis, Barto, Pa.; Paul S. Mahoney, Largo, Fla.

[73] Assignee: General Electric Company, San Jose, Calif.

[21] Appl. No.: 08/826,096

[22] Filed: Mar. 28, 1997

Related U.S. Application Data

[63] Continuation-in-part of application No. 08/667,053, Jun. 20, 1996, Pat. No. 5,793,009.

[51] Int. Cl.$^6$ .................................................. B23K 9/167
[52] U.S. Cl. .............................. 219/75; 219/136; 228/219
[58] Field of Search ........................... 219/74, 75, 136, 219/137 R; 228/219

[56] References Cited

U.S. PATENT DOCUMENTS

| | | | |
|---|---|---|---|
| 2,496,347 | 2/1950 | Herbst | 219/74 |
| 3,349,213 | 10/1967 | Gorman | 219/74 |
| 3,875,364 | 4/1975 | Boyett | 219/74 |
| 4,300,034 | 11/1981 | Schneider et al. | 219/75 |
| 4,309,590 | 1/1982 | Stol | 219/136 |
| 4,343,983 | 8/1982 | Schneider et al. | 219/145.21 |
| 4,495,401 | 1/1985 | Sidorov et al. | 219/74 |
| 4,567,343 | 1/1986 | Sullivan et al. | 219/74 |
| 4,617,444 | 10/1986 | Engelhard et al. | 219/136 |
| 5,635,085 | 6/1997 | Burgoon | 219/74 |
| 5,772,102 | 6/1998 | New et al. | 219/75 |

FOREIGN PATENT DOCUMENTS

| | | | |
|---|---|---|---|
| 51-61454 | 5/1976 | Japan | 219/137.42 |
| 58-181472 | 10/1983 | Japan | 219/75 |
| 7-276050 | 10/1995 | Japan | 219/75 |

*Primary Examiner*—Clifford C. Shaw
*Attorney, Agent, or Firm*—James E. McGinness; Dennis M. Flaherty

[57] ABSTRACT

An apparatus for emitting a laminar flow of inert gas at a location inside a reduced-width, high-aspect-ratio (ratio of depth to width) weld groove. The portion of the gas distribution apparatus extending into the groove has a thickness less than the width of the weld groove and distributes inert gas which displaces the ambient atmosphere overlying the molten pool area at the bottom of the weld groove. The gas distribution apparatus may take the form of a tube, a planar array of mutually parallel tubes joined at the sides, a monolithic block having an elongated cross section with a parallel array of channels drilled or machined therein, or a support frame covered by a gas-permeable skin. To achieve a laminar flow, a gas diffusing structure is incorporated in each gas distribution tube. The gas diffusing structures include the following: a compression spring attached to the end of the gas distribution tube and having an opening which is covered by a porous or non-porous cover; a fine-mesh screen which is wrapped around the distal end of the gas distribution tube and having an opening which is closed by a porous closure; a metal wire wool or braided rope which is stuffed inside the tube; or a distal section of the tube is made from porous material and has an opening covered by a porous end cover.

15 Claims, 11 Drawing Sheets

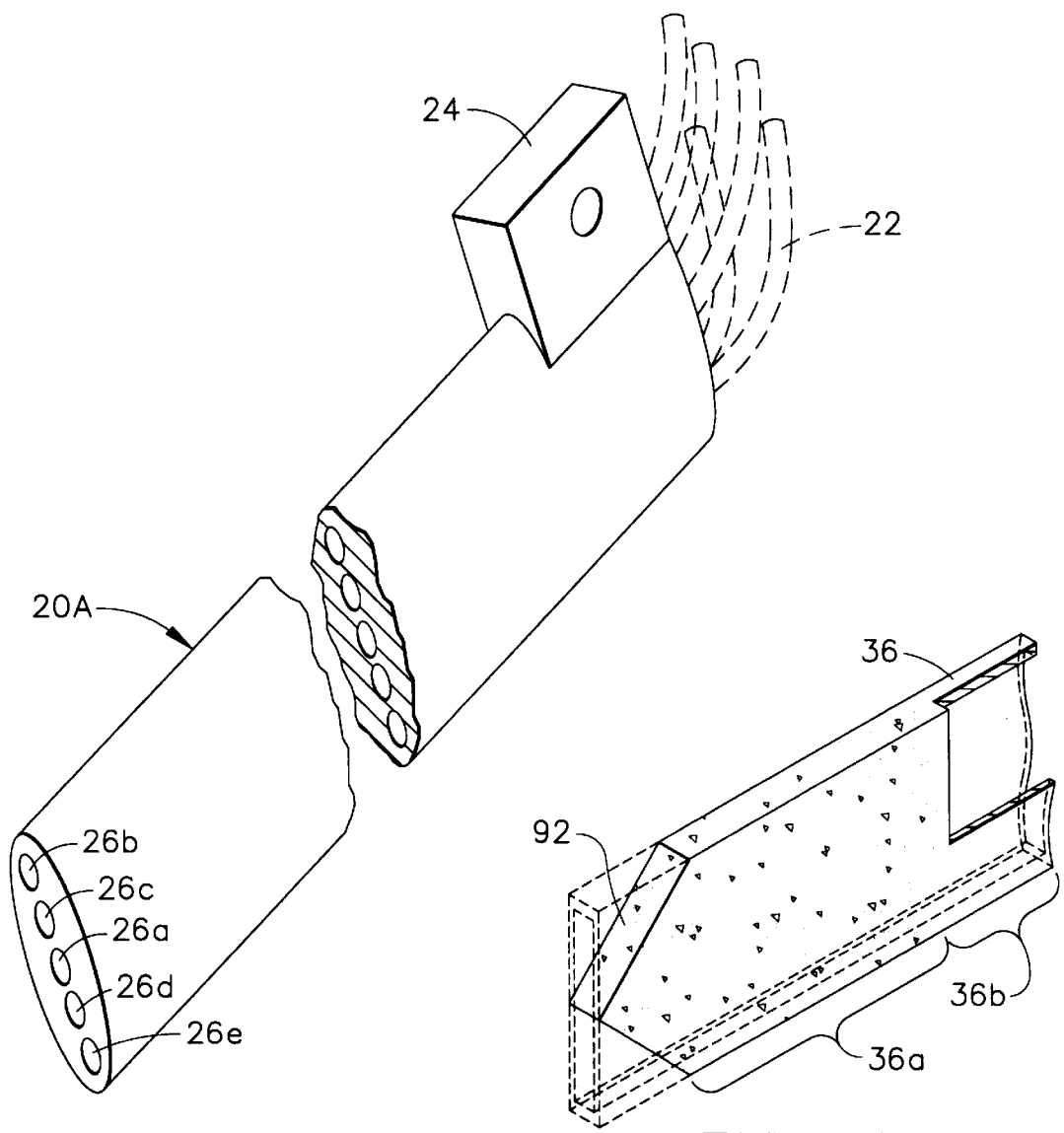
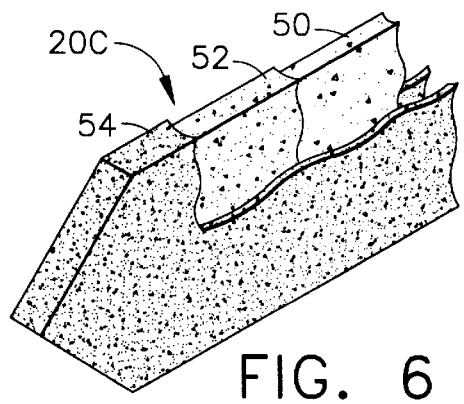

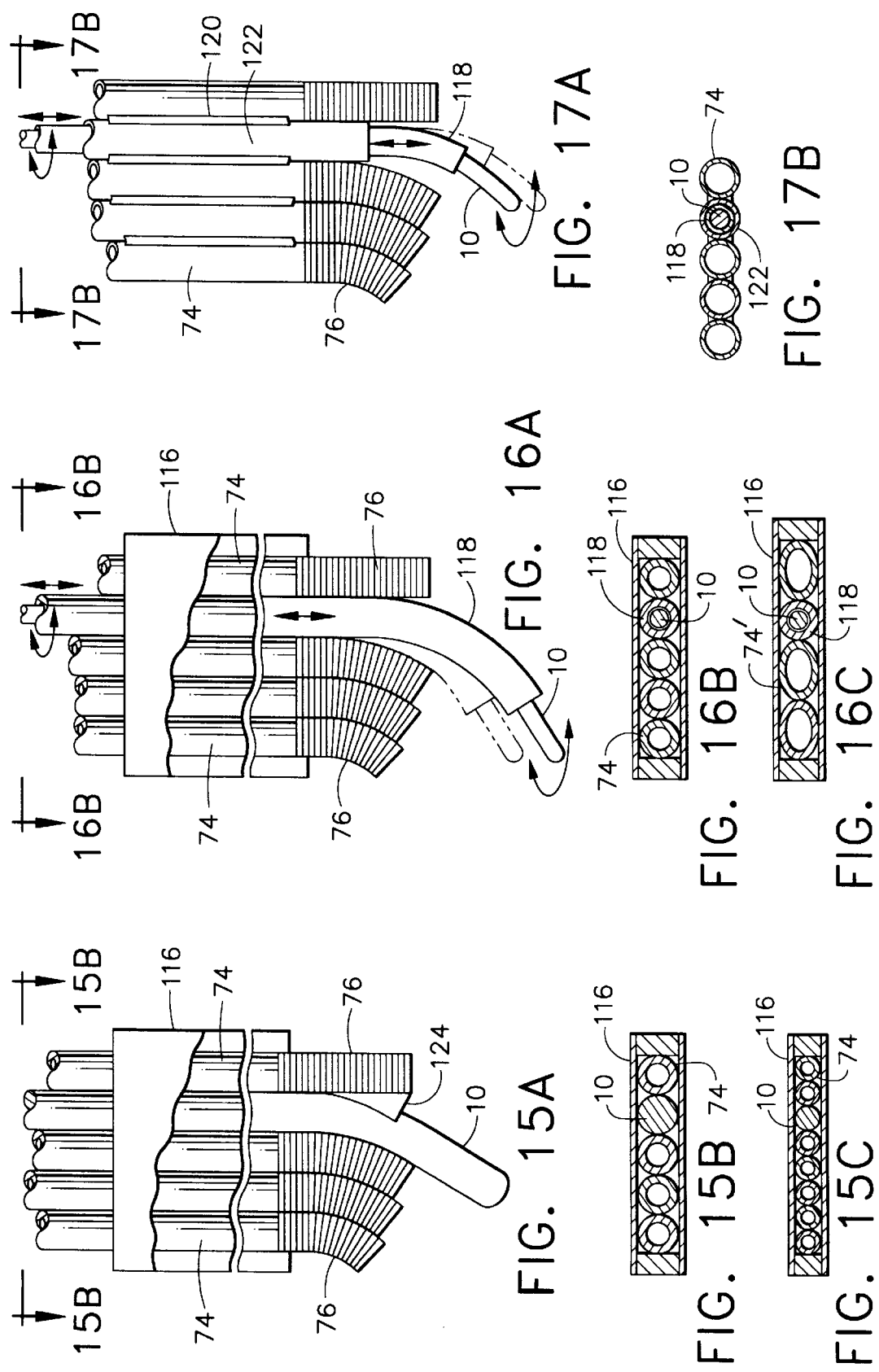

APPARATUS FOR DISTRIBUTING COVER GAS IN REDUCED-WIDTH GROOVE DURING WELDING

RELATED PATENT APPLICATION

This application is a continuation-in-part application of U.S. patent application Ser. No. 08/667,053 filed on Jun. 20, 1996 now U.S. Pat. No. 5,793,009.

FIELD OF THE INVENTION

This invention relates to the automated welding of metal components. In particular, the invention relates to automated welding in a groove of small width using a flat welding electrode.

BACKGROUND OF THE INVENTION

Stress corrosion cracking (SCC) has led to the critical need for repair or replacement of many components and piping in boiling water reactors throughout the world. Welded joints have historically been the areas most likely to fail due to SCC because of their typically high values of tensile residual stress and their high degree of thermal sensitization in the HAZ. One solution to this problem is to replace components with new material having improvements in chemical composition. Due to the exceedingly high cost of replacing some components, the replacement must be durable. Replacements are generally an installation of newer SCC-resistant material joined to older, SCC-susceptible material, so it is highly desirable even for these cases that the joining process improve the residual stress and microstructural conditions in the older material, since the relatively low thermal efficiency, and the resultant effect of overheating, of conventional joining practices has often been one of the direct causes of the old component's failure.

Thus, there is a need for a mechanized welding process which will produce weld joints having very significantly improved SCC resistance. This can be accomplished using joint designs with deep but very narrow groove widths to minimize the amount of heat put into the weld material, thereby reducing the tensile residual stresses in the vicinity of the weld joint. Another benefit is an improvement in the SCC resistance of the microstructure of the heat affected zones (HAZ) adjacent to the weld.

In addition, there is a need for a welding method which decreases the welding time, and the corresponding man-rem personnel radiation exposure and production costs, associated with work on a "critical path" of an operating nuclear power plant. Conventional welding practices, including those used for field work, have relatively low overall thermal efficiency since a large portion of the heat goes into melting the required large volume of filler wire, rather than into fusing the walls of the joint together. This condition is a direct result of the unnecessarily wide joints used. In contrast, the use of very narrow weld grooves improves productivity due to the higher thermal and volumetric efficiencies of this new method, resulting primarily from the reduced heat input parameters and the reduced-width joint design, respectively.

An approach used in the welding industry to complete narrow groove joints on thicker material when the electrode and/or filler wire stickout beyond its means of support becomes excessive is to make the weld torch assembly as thin as practical, to fit within the joint and to be able to reach near or to the bottom, and then to make the joint width as narrow as possible consistent with this reduced internal torch width. Use of this style of internal torch still results in such a wide joint that other techniques must be resorted to in order to make the filler metal pool wet both sidewalls alternately, such as electrode tip lateral oscillation or magnetic arc lateral oscillation, or use of two or more passes per layer.

The approach of thinning the torch to fit within the joint (and in some cases thinning the viewing device as well) has the severe disadvantage of being limited in the amount of joint width reduction possible according to the reduced size of the torch, which typically includes provisions for an electrode holder, a weld gas cup/nozzle, a wire feed guide nozzle (for non-consumable electrode processes), water cooling flow circuits as required, and sometimes viewing camera optical components as well when used with remotely applied processes. The net result is a joint width which is considerably greater than desired to obtain a minimum weld width and therefore minimum weld volume which can be soundly completed with a minimum of heat input. Achieving these minimum values provides the correspondingly lower tensile residual stresses, reduced heat affected zone size and severity, and shorter filler material deposition time.

An improvement over the foregoing apparatus is to make a flat electrode blade which extends vertically downward into the weld groove from a torch block which remains outside the groove. An electrode blade of reduced thickness facilitates arc welding in a groove of reduced width. In the case of a narrow groove which is shallow, a gas cup may be arranged outside the groove to direct an inert gas or a mixture of inert gases into the groove. The gas cup has a gas lens incorporated therein for ensuring that the gas flow out of the gas cup and into the groove is substantially laminar. However, as the depth of the narrow groove is increased, it becomes increasing difficult to provide adequate gas coverage at the bottom of the groove, overlying the weld puddle. In addition, it is conventional practice to provide a gas cup having a width greater than the width at the opening of the weld groove. The result is that some of the shielding gas from the gas cup does not enter the groove, leading to shielding gas wastage and increased welding costs.

SUMMARY OF THE INVENTION

The present invention is an apparatus for emitting a laminar flow of inert gas at a location inside a reduced-width, high-aspect-ratio (ratio of depth to width) weld groove. The portion of the gas distribution apparatus extending into the groove has a thickness less than the width of the weld groove and is located to distribute inert gas which displaces the ambient atmosphere overlying the molten pool area at the bottom of the weld groove, thereby preventing contamination of the molten weld material. Gas diffusing means are incorporated in the distal end of the gas distribution apparatus.

In accordance with one preferred embodiment, the shielding gas is distributed in the groove by one or more gas distribution tubes, each tube having a gas-diffusing distal end extending inside the groove. The gas distribution tube may be attached to the edge of a flat welding electrode or to a filler wire nozzle or may be supported by any other component of the welding apparatus which travels with the welding electrode, e.g., the torch block, the mounting platform or a video camera. Preferably, a first gas distribution tube is provided on one side of the electrode and a second gas distribution tube is provided on the other side of the electrode. Each gas distribution tube may have a circular cross section with an outer diameter less than the width of the weld groove in which the distal end of the tube is inserted. To increase the cross-sectional area of the outlet at the end of the gas distribution tube while maintaining a thickness which is less than the groove width, a circular tube having an outer diameter greater than the groove width can be compressed until the tube deforms into an oval or oblong cross section having a minimum dimension less than the groove width. Alternatively, the gas distribution tubes may have an elliptical shape or a generally rectangular shape with rounded corners.

In accordance with another preferred embodiment, a plurality of identical gas distribution tubes are arranged in parallel and joined in a side-by-side relationship to form a planar array. The tubes may have a circular, square or rectangular cross section. The resulting array has a thickness equal to the width or outer diameter of one tube. Such a gas distribution lance has a thin but stiff non-circular cross-sectional shape, with its width dimension significantly greater than its thickness dimension, and can be utilized in very reduced-width grooves to distribute inert cover gas in the volume overlying the weld puddle. The width dimension of the gas distribution tube assembly is oriented parallel to the depth of the weld groove, and the thickness dimension is oriented perpendicular to the depth of the groove. Each tube is provided with gas diffusing means.

In accordance with a further preferred embodiment, the gas lance comprises a plurality of parallel gas distribution channels drilled or machined in a monolithic block having an elongated cross section, e.g., oblong or elliptical. Each channel is provided with gas diffusing means. Alternatively, the elongated monolithic block can be fabricated from bar stock or by machining round stock to form parallel or slightly tapered flat faces on opposite sides.

The gas distribution apparatus may alternatively consist of a frame covered by a gas-permeable skin. Pressurized shielding gas is fed into the volume enclosed by the skin. This pressurized gas diffuses through the gas-permeable skin and into the weld groove. The gas pressure of the gas source and the gas permeability of the skin are selected to achieve the desired shielding gas coverage in the groove.

In accordance with the invention, the thickness of the gas distribution apparatus is less than the width of the groove between the components to be fused, allowing the outlet end of the gas distribution apparatus to be fitted within the groove and in closer proximity to the molten pool during the joining process. This gas distribution apparatus is suitable for automatic and mechanized electric arc or power beam type of welding or brazing processes, such as the gas tungsten arc (GTA) process or the laser beam process. Brazing is distinguished from welding in that the parent materials are not melted to any significant degree, since in brazing the filler metal melts at a substantially lower temperature than the parent metals.

The gas distribution apparatus of the invention may be suspended from the mounting platform or any component supported by the mounting platform. Alternatively, in applications where the workpiece, not the welding electrode, is moved, the gas distribution apparatus can be mounted on a separate fixed support stand.

One advantage of the gas distribution apparatus of the invention is that shielding gas exits the gas conduit at a location inside the groove instead of outside the groove, thereby eliminating the waste attributable to shielding gas which exits a conventional out-of-groove gas distribution apparatus but does not enter the groove. The thin construction of the gas distribution apparatus of the invention permits direct visual or remote camera viewing of the internal lower portion of the joint, without significant obstruction of the view by the gas distribution tube or tube assembly. Welding and other fusion process productivity advantages include the capability to reduce the number of passes required by decreasing the joint volume, and therefore decreasing the total process time and cost.

BRIEF DESCRIPTION OF THE DRAWINGS

FIG. 3 is a schematic showing a multi-channel gas distribution assembly having a monolithic design in accordance with a third preferred embodiment of the invention.

FIGS. 5 through 10 are detailed views of the outlet end of five different gas distribution apparatuses having porous (i.e., gas-permeable) channels in accordance with further preferred embodiments, including: a porous channel variation (FIG. 5); a triple-wall porous channel variation (FIG. 6); a multiple tube variation (FIG. 7); a porous skin variation (FIG. 8); a corrugated channel variation (FIG. 9); and a coil spring gas distribution variation (FIG. 10).

FIGS. 15A, 16A and 17A are schematics showing side views of integrated gas distribution and filler nozzle assemblies with filler positioning capability in accordance with three different preferred embodiments of the invention.

FIGS. 15B and 15C are schematics showing sectional views of relatively thicker and thinner versions, respectively, of the embodiment shown in FIG. 15A.

FIG. 16B is a schematic showing a sectional view of the embodiment shown in FIG. 16A.

FIG. 16C is a schematic showing a sectional view of a variation of the embodiment shown in FIG. 16A in which the gas distribution tubes are flattened.

FIG. 17B is a schematic showing a sectional view of the embodiment shown in FIG. 17A.

DETAILED DESCRIPTION OF THE PREFERRED EMBODIMENTS

Figure 1:
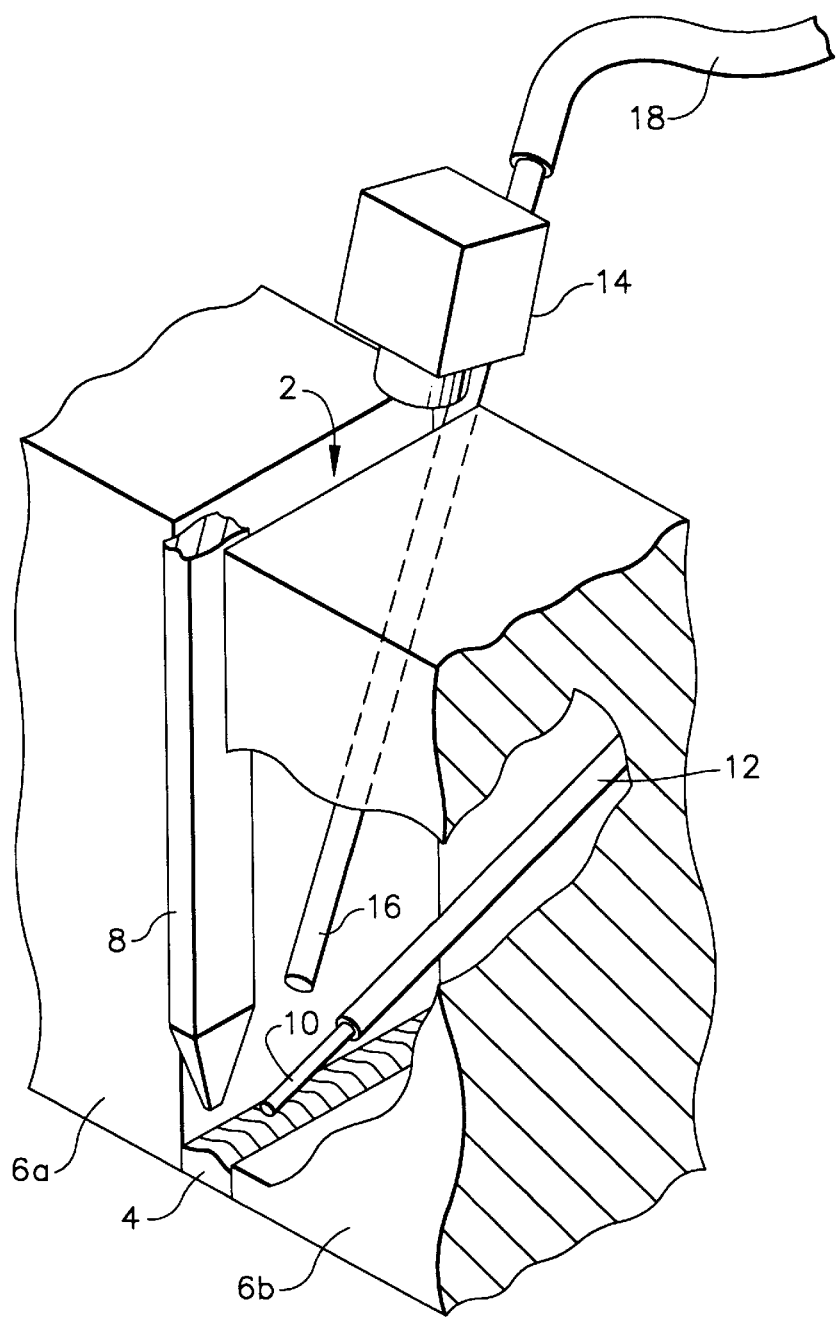
FIG. 1 is a schematic showing a circular gas distribution tube for use in a reduced-width groove in accordance with a first preferred embodiment of the invention.

The gas distribution apparatus of the present invention can be used as part of a gas tungsten arc welding (GTAW) system adapted for welding a reduced-width groove 2 to form a welded joint 4 between parts 6a and 6b, as seen in FIG. 1. The GTAW system has mechanized torch movement and a tungsten electrode 8 with a geometry designed to fit in the reduced-width groove 2. The sidewalls of groove 2 preferably have an acute angle less than 5°. The blade of electrode 8 has a non-circular cross section. In particular, the blade cross section has an elongated dimension which is oriented parallel to the length of the weld joint and a shortened dimension which is oriented perpendicular to the length of the joint, e.g., a cylinder having a generally rectangular cross section.

The weld beads 4 are deposited inside the groove 2 using the thin elongated tungsten alloy electrode 8 to melt the filler wire 10 fed into the groove by a filler material nozzle assembly 12. Electrode 8 fits inside groove 2 with clearance between the electrode and the sidewalls. The blade of electrode 8 is optionally covered with a ceramic coating to prevent arcing to the sidewalls of groove 2. The welding electrode 8 is powered by a conventional arc power supply (not shown) to produce a primary arc.

FIG. 1 shows a gas distribution apparatus comprising a cylindrical tube 16 having an inlet end clamped to one end of a flexible gas hose 18. The other end of the gas hose 18 is connected to a source of inert gas (not shown). The gas distribution tube is attached to a remote viewing camera 14, which is typically carried on a mounting platform which also carries the torch block (not shown in FIG. 1). The tube may be mounted on the camera in a conventional manner, e.g., by means of a bracket (not shown) fastened to the camera housing.

The gas distribution tube 16 may have a circular, elliptical, oblong or rectangular cross section. One variant of the oblong tube is a shape consisting of two parallel straight portions connected at opposing ends by respective semicircular portions. Alternatively, a gas distribution tube having an elongated cross section can be formed by pressing opposing sides of a circular tube with sufficient force to deform the tube. Any other cross-sectional shape can be used provided that the minimum external dimension of the gas distribution tube is less than the width of the groove penetrated by the tube.

The tube 16 must be made of a material which will not lose its rigidity when exposed to the high temperatures produced inside the groove during arc welding. In reducing the invention to practice, a stainless steel tube was used. However, it is within the scope of the present invention to join the gas distribution tube along its length to a stiffener, such as the edge of a thin plate or piece of sheet stock, thereby reinforcing a tube having insufficient rigidity.

Figure 1A:
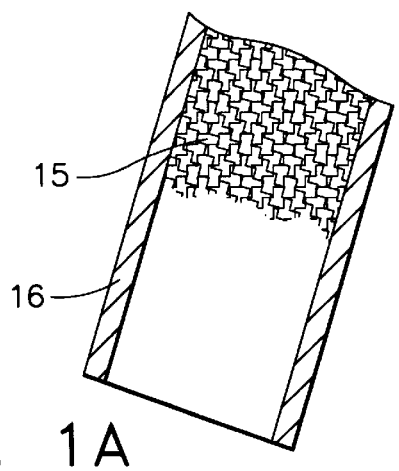
FIG. 1A is a schematic showing a longitudinal sectional view of the distal end of the circular gas distribution tube depicted in FIG. 1.

As shown in FIG. 1A, a gas-diffusing material 15 is installed inside the gas distribution tube 16 along a portion of the length thereof. The diffusing material mitigates turbulence as the inert gas flows through the tube and toward the outlet. The diffusing material may take the form of stainless steel wire wool or a stainless steel, loosely braided rope which is stuffed into the tube.

The flat electrode 8, small filler material nozzle 12 and small or flat gas distribution tube 16, in conjunction with the small bevel angle and selected welding parameters, produce a very thin weld joint. As seen in FIG. 1, the gas distribution tube is preferably inclined at an acute angle relative to the axis of the electrode 8, so that the outlet end of the gas distribution tube is aimed toward the space underneath the tip of the electrode, where shielding gas coverage is needed. However, during welding, the arc, weld puddle and filler material are observed using the remote viewing camera 14. Therefore, the position of the gas distribution tube should be selected so that the camera's view of the weld puddle is not obstructed by the gas distribution tube.

It is important to note that the embodiment shown in FIG. 1 distributes gas inside a reduced-width welding groove using only a single tube 16 having an outlet located inside the welding groove 2. For this preferred embodiment, a conventional gas cup positioned outside the groove for supplying a laminar flow along the electrode axis is not used in conjunction with the gas distribution tube.

In accordance with an alternative embodiment shown in FIG. 5, a gas distribution tube 36 has a rectangular welding gas flow channel, the open end of which is covered by an end cover 92. The tube 36 has a porous section 36a (indicated by speckling) and a non-porous section 36b. The end cover 92 is also preferably made of a porous material, for example, sheet stock made from sintered stainless steel powder.

Pressurized inert gas flows axially down the rectangular channel of tube 20C and then through the porous walls 36a or porous end cover 92. Flow through the gas-permeable walls and end cover diffuses the inert gas exiting the tube, producing a laminar flow inside the weld groove which displaces the ambient atmosphere overlying the molten weld puddle. Although the mitered end allows tube 20C to be located closer to the electrode or closer to the bottom of the weld groove or both, the end of the tube may optionally be perpendicular to the tube axis, as indicated by dashed lines in FIG. 5. Although FIG. 5 shows a tube 36 having a rectangular cross section, it will be apparent to those skilled in the art that tubes having other suitable shapes, e.g., circular, elliptical or oval, can also be made porous at the distal end thereof.

Figure 2:
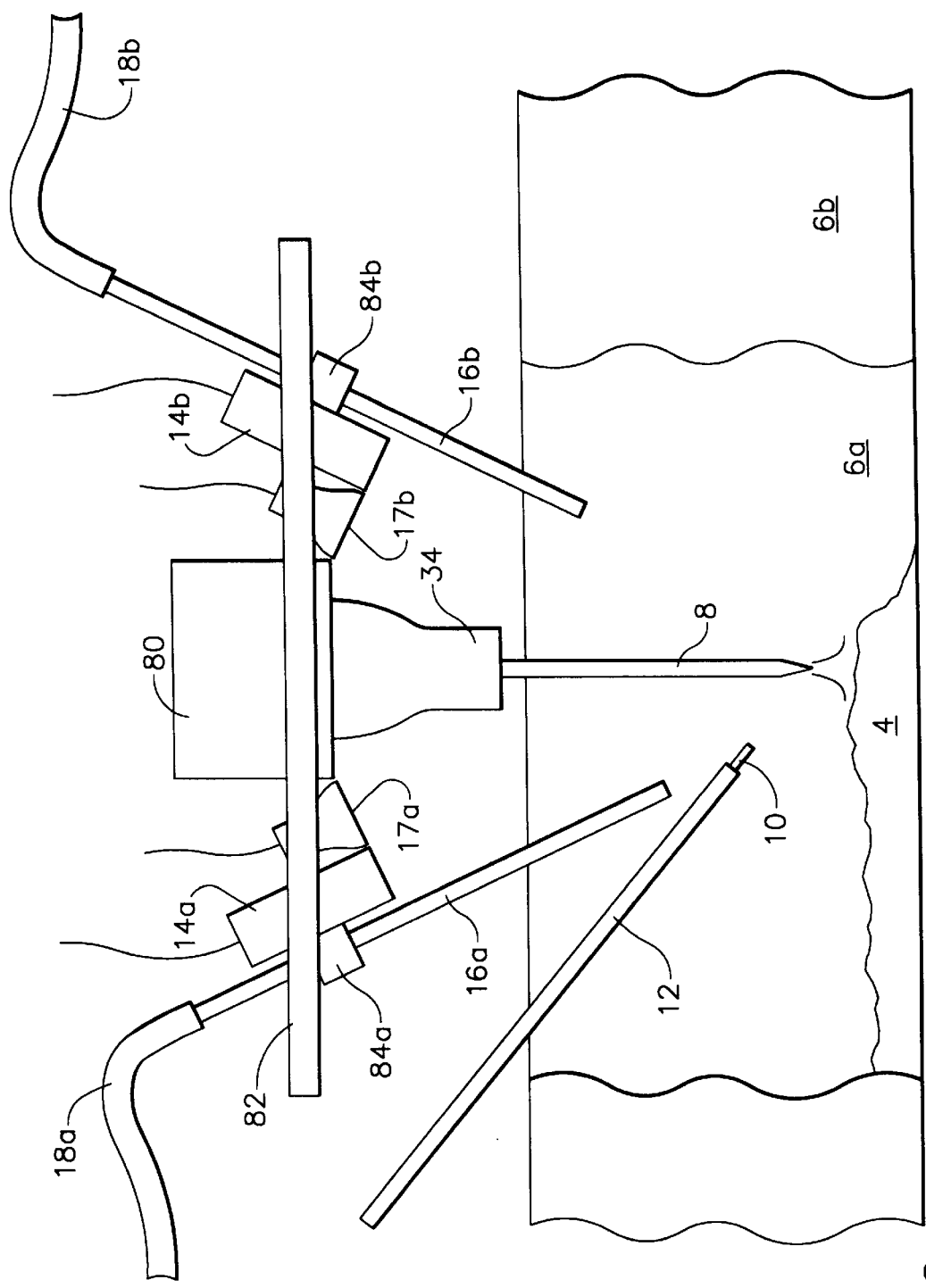
FIG. 2 is a schematic showing a gas distribution apparatus in accordance with a second preferred embodiment of the invention having two gas distribution tubes arranged on opposite sides of the welding electrode.

FIG. 2 shows another arc welding apparatus suitable for joining components separated by a reduced-width, high-aspect-ratio weld groove. A torch block 80 is attached to a mounting carriage 82 which is displaceable in mutually perpendicular directions lying in the plane of the weld groove. The mounting carriage also supports a pair of remote viewing cameras 14a and 14b and a pair of lights 17a and 17b, which are connected to a suitable power source by electrical leads.

A primary gas cup 34 incorporating a conventional gas lens is fastened to the torch block 80. Similarly an upper end of the electrode blade 8 is fastened to the torch block by conventional means (not shown). During arc welding, the primary gas cup 34 remains outside and overlies the weld groove, while the electrode 8 extends into the groove. The distal end of a wire feed nozzle 12 is inserted inside the groove in a position such that the tip of the filler wire 10 lies underneath the tip of the electrode at a point where a weld bead is to be formed.

Shielding gas for displacing the ambient atmosphere is distributed inside the groove by a pair of gas distribution tubes 16a and 16b arranged on opposing sides of the electrode 8. The gas distribution tubes are connected to a source of inert gas by means of respective flexible hoses 18a and 18b, and are respectively mounted on cameras 14a and 14b by means of brackets 84a and 84b. As seen in FIG. 2, the gas distribution tubes may be mounted so that their outlets are at different elevations inside the groove. Each gas distribution tube 16a, 16b may have a structure similar to that described in connection with the preferred embodiments of FIGS. 1 and 5.

In accordance with the preferred embodiment shown in FIG. 2, a first laminar flow of shielding gas is directed downward by the primary gas cup 34 from outside the groove. A portion of the primary gas flow enters the groove and flows downward and along the electrode blade. A second laminar flow of shielding gas flows from the distal end of the first gas distribution tube 16a and a third laminar flow of shielding gas flows from the distal end of the second gas distribution tube 16b. The first, second and third gas flows are all generally directed toward the space under the tip of the electrode 8. The gas flows can be adjusted to displace the ambient atmosphere from the space overlying the weld puddle. For example, in one application involving a weld groove having a depth greater than 4 inches, the gas distribution tubes 16a and 16b were straight stainless steel tubes stuffed with stainless steel wool material and having an outer diameter of 3/16 inch. The flow through each tube was 10 CFH at 10–20 psi. The flow through the primary gas cup was 50–60 CFH at 75 psi. The composition of the gas flow was the same for the gas cup and the gas distribution tubes. However, it will be apparent to persons skilled in the art of arc welding that for some applications, it may be desirable to use a primary gas flow composition different than the composition of the flows out of the gas distribution tubes.

In accordance with additional preferred embodiments of the invention, the gas distribution apparatus comprises a gas lance which extends into the weld groove, but is supported at a point located outside the weld groove. In particular, the cross-sectional shape of the gas distribution lances is designed to be thin in a direction perpendicular to the depth and length of the weld groove, and wide in a direction parallel to the groove. Also, the height and/or width may be tapered along the length of the gas distribution lance in order to provide as much stiffness as possible toward the inlet (mounted) end, and to be as narrow and thin as possible toward the outlet end. Several designs of non-circular gas distribution lances are shown in FIGS. 3 through 11.

The reasons for using a non-circular (e.g., blade-shaped) gas lance include the following: A) to provide a lateral stiffness to the lance, while providing only the minimum practical width (in a direction perpendicular to the walls) when used in grooves of reduced width; B) to increase the cross-sectional area of the gas outlet for a given weld groove width; and C) to provide a minimum lance width (in a direction perpendicular to the weld seam) so that the view in the groove from a remote weld-viewing camera is not obstructed by the portion of the lance passing through the view.

In accordance with a further preferred embodiment shown in FIG. 3, a gas lance 20A comprises a plurality of parallel gas distribution channels 26a–26e drilled or machined in a monolithic block 25 having an elongated cross section, e.g., oblong or elliptical. Alternatively, the elongated monolithic block can be fabricated from bar stock or by machining round stock to form parallel or slightly tapered flat faces on opposite sides. The distal end of each channel 26a–26e is open, forming a row of outlets for the shielding gas. The other end of each channel is in flow communication with a gas conduit 22, via which inert gas from a pressurized source (not shown) is supplied to the channel. Suitable diffusing material can be stuffed inside each channel. Alternatively, a fine-mesh screen (not shown) can be attached to the end face of the monolithic block, covering the openings of all of the flow channels 26a–26e. The fine-mesh screen may take the form of metal alloy sheet stock in which a multiplicity of fine-diameter apertures have been formed by laser drilling or electro-etching. The gas lance 20A is mounted on a mounting bracket 24. The mounting bracket 24 is connected to a drive apparatus (not shown) for raising and lowering the gas lance. Preferably the mounting bracket is located outside the weld groove.

Figure 4:
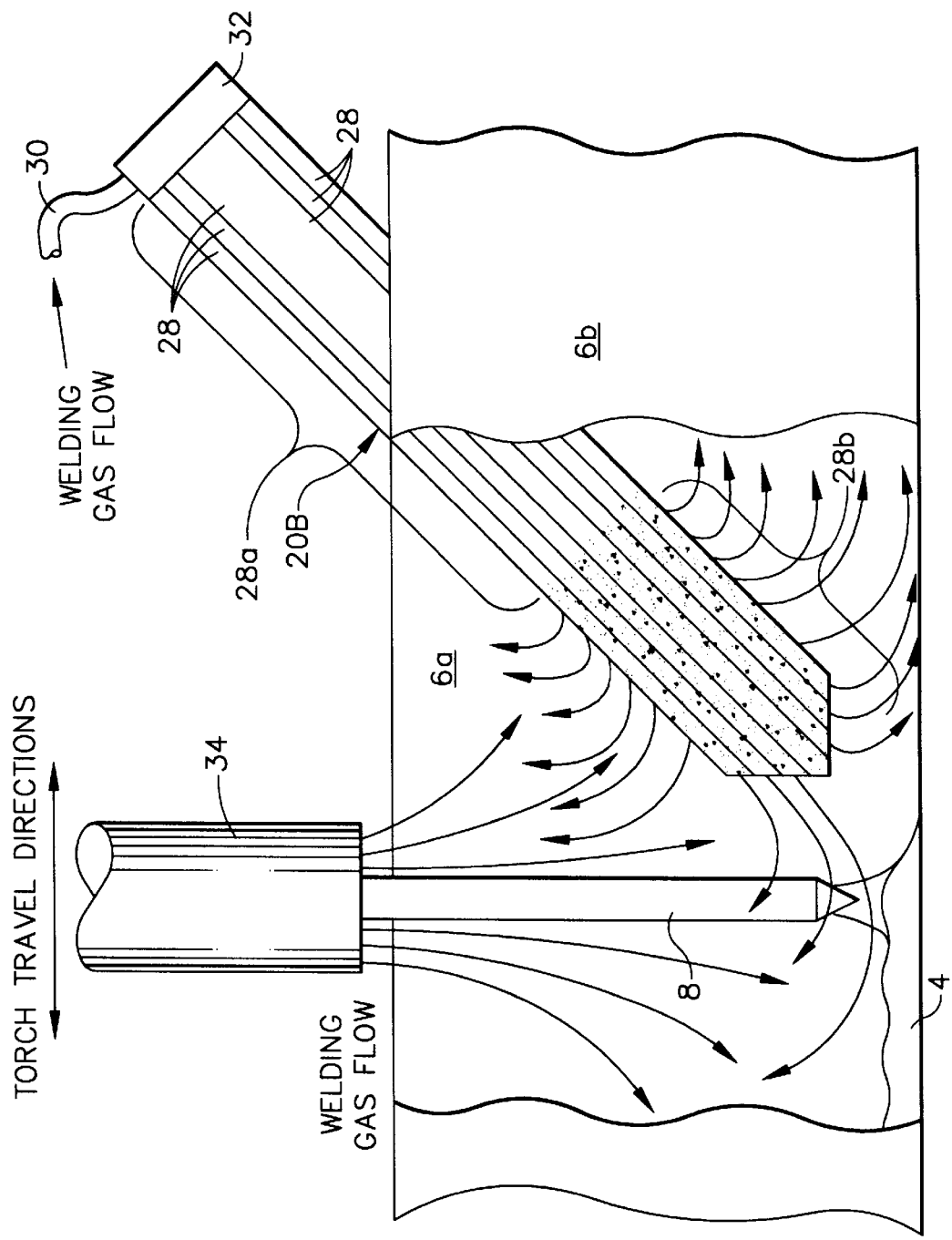
FIG. 4 is a sectional view through a weld joint of a multi-channel gas lance having porous tubes in accordance with a fourth preferred embodiment of the invention.

In accordance with a further preferred embodiment of the invention shown in FIG. 4, a laminar flow of inert gas (hot/molten bead-shielding gas and/or welding arc-forming gas) is distributed inside the weld groove by a gas lance 20B. In some very deep joints, the gas lance may be the only source of welding gas. This configuration can improve the local welding gas quality near the root of the joint by minimizing the gas dilution, and can reduce the total flow rate required for sufficient weld bead coverage (as compared to the practice of feeding gas from a gas cup external to the groove).

A primary portion or all of the welding gas may be fed directly to the lower portion of the joint through the gas lance, which may comprise a multiplicity of gas distribution tubes 28, each tube having a non-porous section 28a which acts as a conduit and a porous section 28b which acts as only a diffuser if the distal end is closed. The porosity of the tube walls is indicated by speckling in FIG. 4. The respective tubes 28 of the gas lance act as conduits/diffusers for the primary welding gas flow supplied via line 30 and gas header 32. Each tube may have a circular, square or rectangular cross section. The tubes are joined in side-by-side relationship to form a planar array having a width equal to the width of a single tube, which in turn is less than the width of the weld groove.

Optionally, an auxiliary welding gas flow may be provided from above the joint via a conventional gas cup 34 with a conventional gas diffuser lens in order to protect the hot electrode from oxidization, as well as to supplement the gas flow from the gas lance within the joint. The compositions of the gases coming from above the joint and from within the joint may be different, since the auxiliary inert bead coverage gas would be provided primarily by the conventional gas cup 34, and the arc-forming gas (with tailored ionization potential and heat transfer properties) as well as the coverage gas would be provided primarily by the gas lance.

The new design of welding gas nozzle assembly disclosed herein, which can be shaped in the form of a gas lance, may have a portion toward the outlet end made of reticulated porous tubing material so as to reduce turbulence with the atmosphere outside of the groove (by reducing the local flow velocity and Reynolds number), and to allow laminar type flow within the groove in the vicinity of the deposited beads. [The Reynolds number, $Re=\rho VL/\mu$, where $\rho$ is the density of the fluid, V is the flow velocity, L is the characteristic length descriptive of the flow field, and $\mu$ is the viscosity of the fluid. The nature of the flow (laminar or turbulent) is determined by the value of the dimensionless number Re.] The outlet ends of the tubing may be closed with porous or non-porous material in order to force more of the gas out the pores in the tube walls than would occur if the tubing were open-ended.

Alternate forms of construction of the porous material include electro-etched or laser-drilled drawn tubing or flat-sided channels fabricated from sheet stock which is perforated at least near its outlet end either before or after assembly. For example, perforated sheet stock can be bent to form a tube of square cross section with overlapping or butted edges joined by conventional means.

In accordance with a further variation shown in FIG. 6, the gas lance 20C comprising a pair of rectangular tubes joined at opposing sides, each tube having a porous distal end. The porous section of each tube of gas lance 20C consists of multiple porous walls nested one inside the next, e.g., an inner porous wall 50 of coarse-grade porosity, a middle porous wall 52 of medium-grade porosity and an outer porous wall 54 of fine-grade porosity. Preferably the ends of the tubes are covered by an end cover. Optionally, the end cover is porous.

Figure 7:
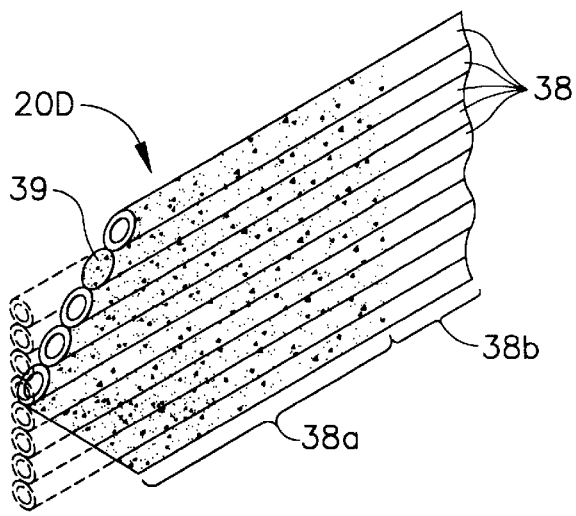

The gas lance 20D shown in FIG. 7 comprises a planar array of parallel gas distribution tubes 38 joined in side-by-side relationship. Each tube 38 has a porous section 38a (indicated by speckling) and a non-porous section 38b, in analogous manner to the embodiments of FIGS. 4–6. The distal ends of the tubes 38 may be angled (as shown by solid lines in FIG. 7) or perpendicular (as shown by dashed lines in FIG. 7) to the gas lance axis. The opening at the end of each tube is preferably covered by an end cover 39. The end cover 39 may be made from the same porous material used for the tube.

Figure 8:
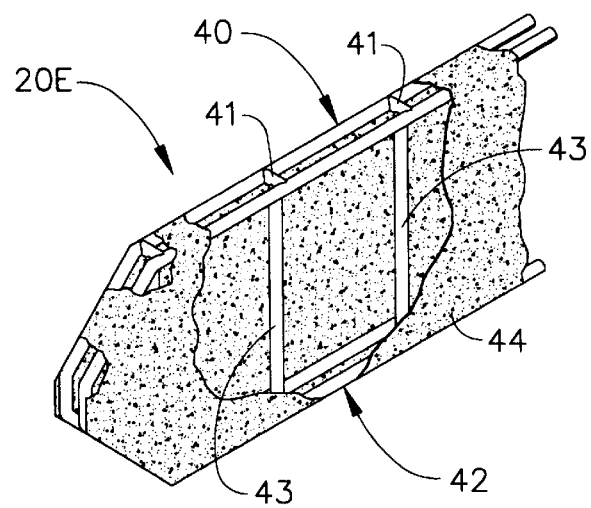

In accordance with yet another preferred embodiment shown in FIG. 8, a gas lance 20E comprises a pair of support frames 40 and 42 rigidly connected by a multiplicity of cross members 41. Opposing pairs of cross members 41 are in turn connected by respective vertical support members 43. A porous skin 44 is stretched across the support frames 40 and 42 to form a chamber which is in flow communication with a source of pressurized inert gas (not shown). The porous skin may take the form of an electroformed or laser-drilled perforated stainless steel sheet material. A non-porous skin (not shown) can be stretched over portions of the support frames remote from the nozzle outlet to form a conduit for carrying the welding gas to the chamber. The pressurized shielding gas in the chamber diffuses through the porous skin 44 and flows in laminar fashion into the surrounding volume of the weld groove.

Figure 9:
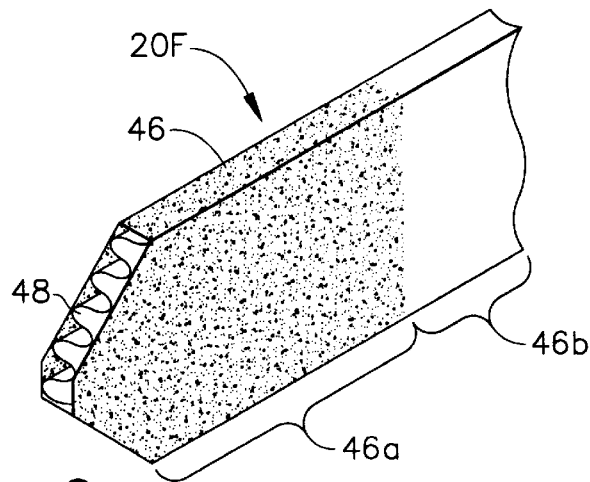

In accordance with a further variation shown in FIG. 9, a gas lance 20F comprises a thin housing 46 supported by a corrugated spine 48. The corrugations preferably run parallel to the gas lance axis. The peaks and valleys of the corrugations preferably contact the inner surface of the housing 46 to provide support and to form a series of parallel channels for welding gas flow. The thin housing 46 has a porous section 46a (indicated by speckling) and a non-porous section 46b, in analogous manner to the embodiments previously described. The distal end of the housing 46 may be angled or perpendicular to the filler guide nozzle axis, and may be open or closed. For ease of understanding, the distal end of the gas lance is shown open to reveal the corrugated structure inside the housing. However, it should be understood that the opening seen in FIG. 9 is preferably closed by a layer of the same perforated material used for porous section 46a.

Figure 10:
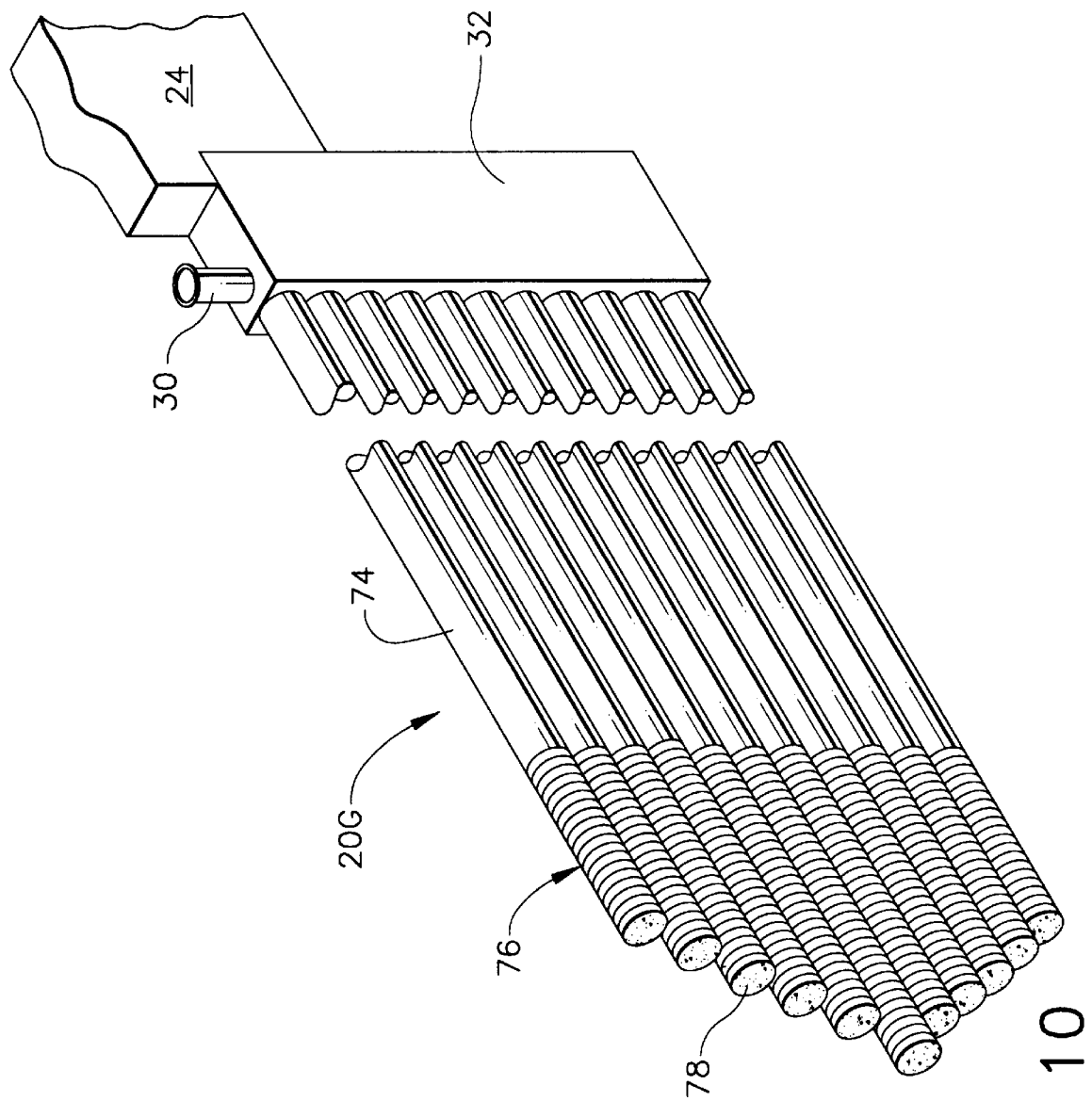

In accordance with the variation shown in FIG. 10, a gas lance 20G comprises a planar array of mutually parallel gas distribution tubes 74 joined in side-by-side relationship. Each tube 74 has a coil spring section 76 attached to its end. The end of each coil spring is closed by a plug 78, which may be porous. The porosity of the plug and the spring constant of the coil spring are selected so that welding gas flow supplied via line 30 and gas header 32 under pressure will diffuse through the turns of the coil spring. This creates a laminar flow of gas inside the weld groove. The distal ends of the coil springs 76 are preferably angled (as shown in FIG. 10). In accordance with a further improvement, the coil spring section may comprise concentrically arranged coarse and fine coil springs. The foregoing gas-diffusing coil spring also has application in the gas distribution tubes depicted in FIGS. 1 and 2.

In accordance with the broad concept of the present invention, dual gas lances may be located on the leading and trailing sides of the electrode, with respect to the torch travel direction. These gas lances may be used alternatingly depending on the travel direction or simultaneously independent of travel direction, as required, to obtain sufficient flow to establish both a stable arc voltage and high-purity weld deposit inert gas coverage.

Figure 11:
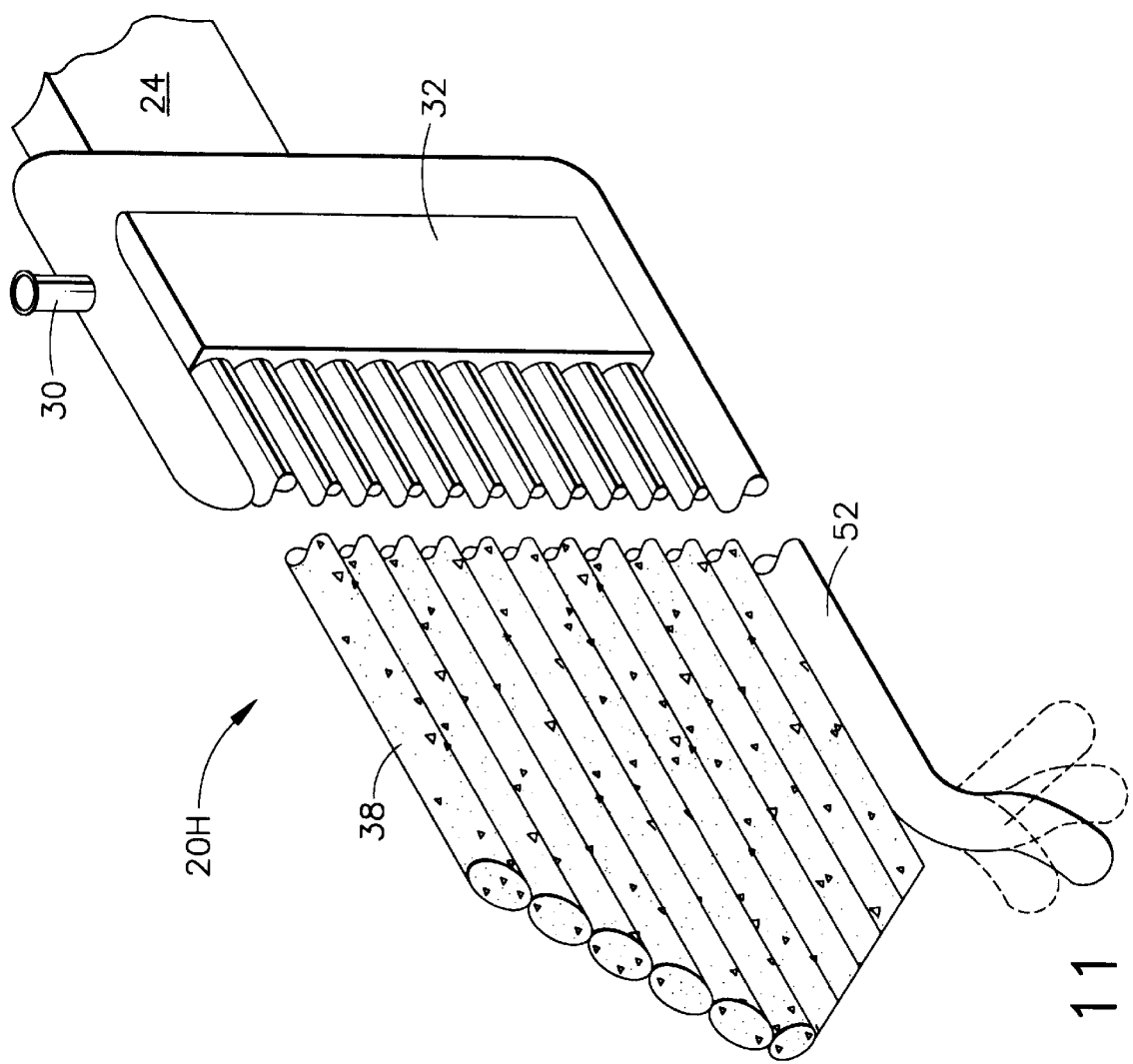
FIG. 11 is a schematic showing a gas dam mounted on a gas distribution tube assembly in accordance with yet another preferred embodiment of the invention.

Referring to FIG. 11, a gas-confining or sealing dam 52 may be effectively used on the leading or on the leading and trailing sides of the electrode to confine a portion of the inert gas to the vicinity of the weld puddle area. These movable dams may be an integral part of the gas lance, may be mechanically attached to the gas lance, or may be mounted separately ahead of and/or behind the gas lance. The dam would extend a significant distance into the joint and would also extend across a significant fraction of the joint width so as to effectively minimize contamination of the inert gas with the surrounding ambient atmosphere in the groove.

The dams would preferably be made of a compliant material (with a non-compliant support structure) so that a more effective seal can be achieved to the inside surfaces of the joint. An example of this type of seal is woven metal mesh (or silicon rubber tubing or sponge) filling a canted-coil spring, with a solid rod passing through the mesh and extending a portion of the length of the spring. The rod is made, e.g., of spring steel having a small enough gauge to allow the rod to flex. For higher sealing efficiency, the gas dams may be mounted such that they are spring loaded in the lateral and depth directions to make essentially continuous contact with the joint walls and root surface.

Figure 13:
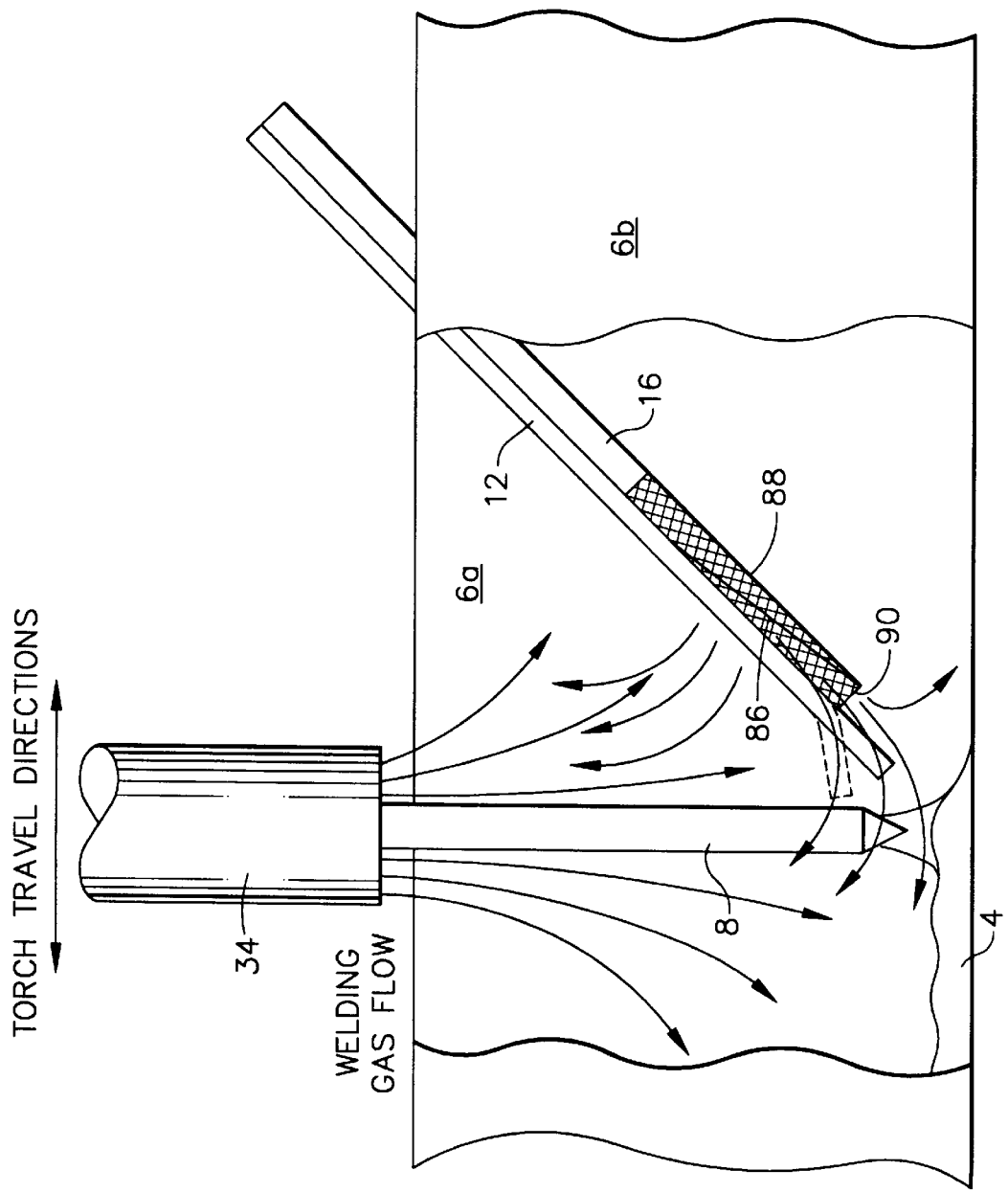
FIG. 13 is a schematic showing an in-groove gas distribution tube having a fine-screen cylindrical diffuser window, shown with an integrated filler material nozzle, in accordance with yet another preferred embodiment of the invention.

In accordance with a further preferred embodiment depicted in FIG. 13, the gas distribution tube 16 has an elliptical outlet 86 formed by cutting the distal end of the tube at an acute angle relative to the tube axis. A fine-mesh screen 88, made from laser-drilled or electro-etched sheet stock, is wrapped around the distal end of tube 16 and attached to the outer circumferential surface of the tube by suitable means, e.g., brazing. The ends of the screen 88 may be overlapped or butted and then joined by suitable means. The end of the circular cylindrical screen wrapped around the distal end of tube 16 is then closed by a circular screen 90 made of the same fine-mesh screen material. The periphery of screen 90 is joined to the end of screen 88 by suitable means. The resulting closed circular cylindrical gas-permeable structure functions (to the extent its apertures are not blocked by the underlying gas distribution tube) as a gas-diffusing window. Pressurized inert gas flows axially down the gas distribution tube 16 and then through the gas-diffusing window, i.e., through screens 88 and 90. Since the wall of gas distribution tube 16 is not gas-permeable, the angle of taper at the distal end of the tube determines the directionality of the laminar gas flow exiting the tube. Also, the tapered distal end of tube 16 projecting inside the cylindrical diffuser window serves as a stiffener for the thin screen material wrapped therearound. Alternatively, the gas distribution tube can have an endface perpendicular to the tube axis and the window can be formed by cutting out a tube section beginning at a short distance from the tube end. A porous filler material can be placed inside the section of gas distribution tube 16 which is surrounded by the screen. The porous filler material diffuses the inert gas before it passes through the perforated screen.

As seen in FIG. 13, the gas distribution tube 16 is joined to the exterior of a filler metal guide nozzle 12, which lends support to tube 16. However, provided that the gas distribution tube 16 shown in FIG. 13 is sufficiently stiff, it need not be joined to the filler metal guide nozzle. The filler metal guide nozzle 12 may optionally be curved at its end, as indicated by dashed lines in FIG. 13.

Figures 14A, 14B, 14C:
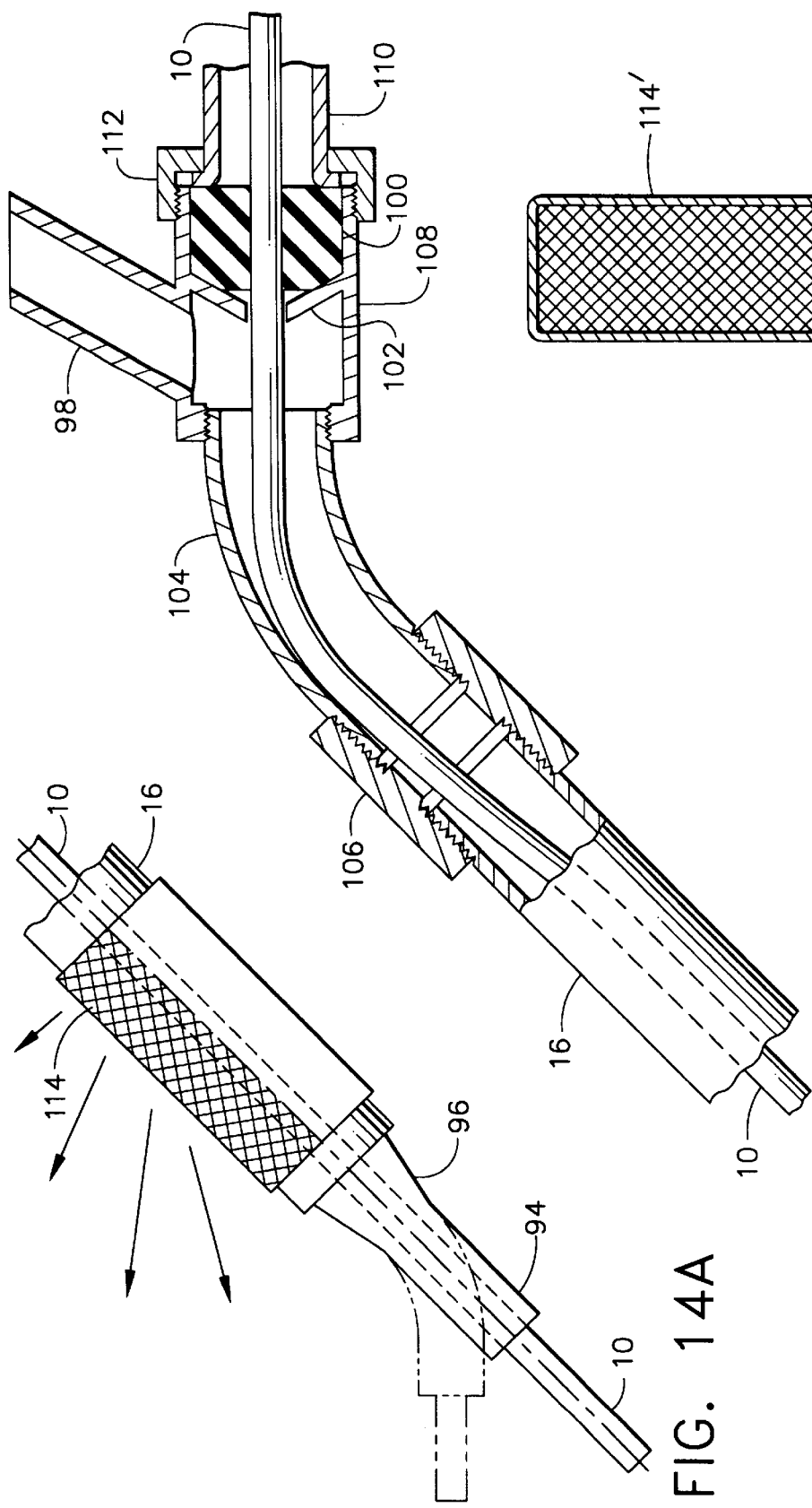
FIGS. 14A and 14B are schematics showing side views of the inlet and outlet ends, respectively, of a gas distribution tube which doubles as the filler wire guide nozzle in accordance with another preferred embodiment of the invention.
FIG. 14C is a schematic showing a cross-sectional view of a gas distribution tube having an outlet end with an extended fine-mesh screen.

In accordance with a further variation shown in FIGS. 14A and 14B, the gas distribution tube 16 also serves as the filler wire guide nozzle, i.e., the filler wire is fed through the tube while inert gas flows around the filler wire. The inner diameter of tube 16 must be greater than the outer diameter of the filler wire by an amount sufficient to provide an adequate cross section for achieving the desired gas flow rate down the tube. As seen in FIG. 14A, gas distribution tube 16 has a tubular section 94 of reduced diameter at the wire outlet end thereof. The tubular end section 94 may be formed by any conventional means, e.g., by swaging. Tubular end section 94 is coaxial with the unswaged central section of the gas distribution tube 16. The end section 94 connects to the central section of tube 16 by a conical transition section 96.

The tubular end section 94 has an inner diameter slightly greater than the outer diameter of the filler wire 10. Therefore, when the filler wire 10 is passed through the gas distribution tube 16 as shown in FIG. 14A, the tubular end section 94 functions as a filler wire guide nozzle by maintaining the position of the filler wire portion which is sliding therethrough.

As seen in FIG. 14B, the gas distribution tube 16 is connected to a curved conduit 104 by means of a fitting 106 with threaded ends. The curved conduit 104 is in turn threadably coupled to a fitting 108 which has both a gas inlet 98 and a filler wire inlet. The filler wire inlet is threadably coupled to a flexible conduit 110 by means of an end cap 112. A sliding gas seal 100, installed inside the fitting 108, maintains the position of the filler wire portion sliding therethrough while impeding the escape of inert gas out of the tube. Gas seal 100 has a central circular hole of diameter substantially equal to or slightly greater than the outer diameter of the filler wire 10. Seal 100 may be installed against a conical seat 102 which exerts a radially inwardly directed force that presses the seal against the outer surface of the filler wire. Between the sliding gas seal 100 and the distal end 94 of the gas distribution tube, the filler wire is free to bear against the wall of the distribution tube.

The gas inlet 98 (see FIG. 14B) is connected to a source (not shown) of pressurized inert gas. The inert gas flows through curved conduit 104 and down gas distribution tube 16 toward the terminal end 94. The gas outlet is formed by making a window in a portion of the central section of tube 16 which is closest to the end 94. For example, the window can be formed by cutting away a 180° section of tube 16. The resulting opening is then covered with a rectangular piece of fine-mesh screen 114, which is attached to the gas distribution tube 16. The fine-mesh screen 114 can be made from laser-drilled or electro-etched sheet stock. The ends of the screen 114 may be overlapped or butted and then joined to each other by suitable means, e.g., brazing. Then the screen is attached to the outer circumferential surface of the tube by suitable means. The inert gas flows down tube 16 and then out the window through screen 114. The screen 114 produces a laminar flow of inert gas into the weld groove. It will be apparent to those skilled in the art that multiple windows or openings could be formed in tube 16 and covered by screen 114.

Although the embodiment of FIGS. 14A and 14B has a gas distribution tube which is circular in cross section, it will be apparent that the tube could also have a non-circular, e.g., elliptical or rectangular, cross section. A gas distribution tube 16 having a box-shaped screen 114 with a generally rectangular cross section and a height greater than its width is shown in FIG. 14C.

It will also be appreciated that a gas distribution tube having a filler wire guide nozzle at its distal end could be fabricated without swaging the tube end sections. For example, a circular end plug having a central circular aperture could be inserted in the end of a circular cylindrical gas distribution tube having a screen-covered window. The filler wire would then pass through the central aperture in the end plug.

Figure 12A:
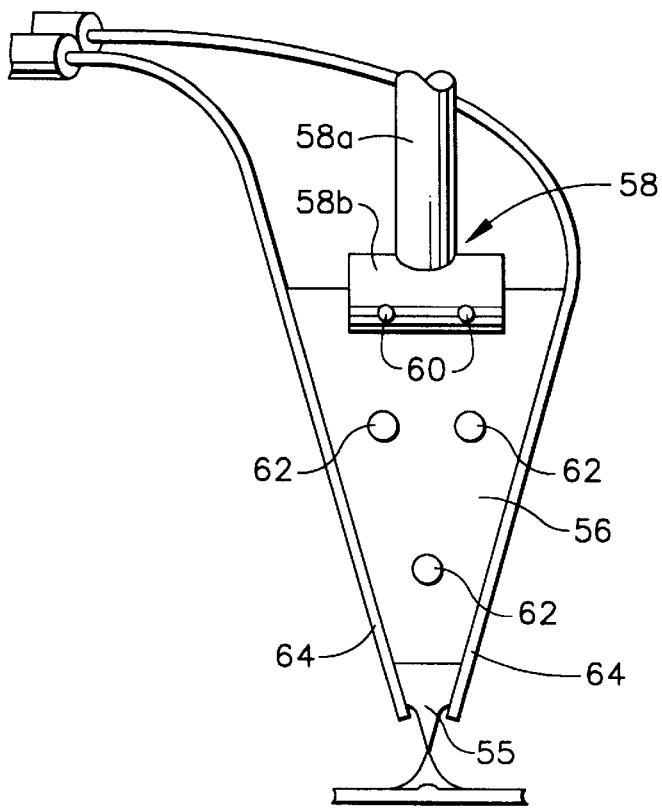
FIG. 12A is a front view of a composite gas distribution apparatus and non-consumable electrode in accordance with another preferred embodiment of the invention.
Figure 12B:
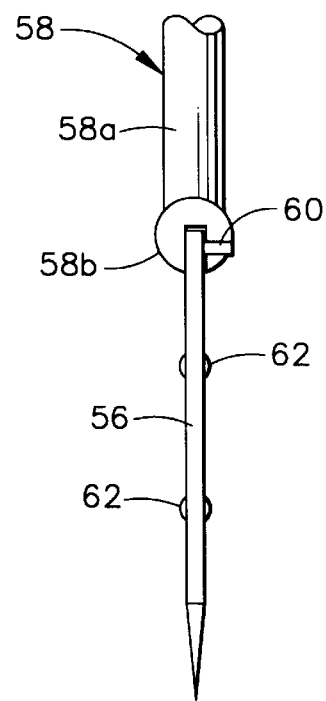
FIG. 12B is a side view of the non-consumable electrode incorporated in the composite structure depicted in FIG. 12A.
Figure 12C:
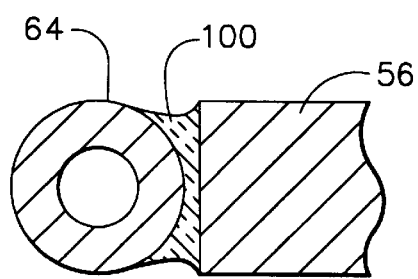
FIG. 12C is a detailed sectional view of a gas distribution tube attached to an edge of a flat non-consumable electrode in accordance with the preferred embodiment shown in FIG. 12A.

An alternative gas distribution apparatus can be constructed by mounting a pair of gas distribution tubes 64 on the side edges of a triangular electrode/stiffener 56 having a replaceable electrode tip 55, as shown in FIGS. 12A–12C. The electrode/stiffener 56 is fabricated from tungsten or other suitable high-temperature alloy and functions both as a non-consumable welding electrode and as a gas distribution tube support structure. A triangular-shaped electrode/stiffener made from tungsten alloy sheet stock can provide sufficient cross-sectional area at its base (wide) end so that it can successfully resist unacceptable bending, as well as carry exceptionally high arc current despite its minimum thickness. To prevent arcing from the gas distribution tubes, each tube 16 is connected to the respective side edge of the electrode blade by means of electrically insulating material 100 (see FIG. 12C).

The base of the triangular electrode blade is clamped or otherwise held by an electrode holder 58. Electrode holder 58 is preferably made of a conductive, oxidation-resistant material such as copper alloy (e.g., beryllium-copper alloy), optionally electroplated with silver or nickel. The electrode holder preferably takes the form of a T-shaped metal body, comprising a shank 58a and a crosspiece 58b. Shank 58a is connected to a conventional welding torch (not shown). Crosspiece 58b has a longitudinal slot shaped for receiving the triangular blade base with sufficient play to allow easy insertion and removal. The blade base is held securely in the crosspiece slot by tightening a pair of set screws 60 in a corresponding pair of threaded holes formed in the crosspiece. The blade can be readily removed from the holder after the screws have been loosened. This allows easy replacement of a damaged electrode/stiffener blade. Alternatively, instead of using screws, the blade could be secured in the holder by brazing to create a monolithic blade assembly, i.e., the blade would not be readily replaceable.

The blade body 56 is preferably covered with an insulating coating, e.g., $Al_2O_3$ or $Y_2O_3$, to prevent arcing to the weld groove sidewalls. Also, all rough edges on the stamped or cut blade are deburred to prevent arcing. In accordance with this preferred embodiment, the flat triangular blade incorporates one or more insulating stand-offs 62. Each stand-off 62 consists of a slug of insulating material, e.g., $Al_2O_3$ or $Y_2O_3$, having a cylindrical peripheral wall and a pair of slightly convex opposing surfaces or radiused edges at each end of the cylinder. As best seen in FIG. 12B, each insulating stand-off 62 protrudes on both flat sides of the electrode blade beyond the plane of the blade surface. These stand-offs serve to maintain a minimum gap between the sidewalls of the weld groove and the flat sides of the electrode/stiffener blade, thus preventing scratching or excessive wear of the ceramic coating during electrode travel in the weld groove. A sufficiently deep scratch on the coated surface of the blade will remove the ceramic coating, leaving the blade susceptible to arcing along the uncoated locus.

The gas distribution apparatus in accordance with the present invention efficiently provides the required welding gas locally near the weld bead and electrode tip within the groove. This is an improvement over the conventional methods of inefficiently locating the gas distribution cup outside of the groove or providing a gas cup around the electrode within the groove, which must then be significantly wider than is the case for the gas distribution configurations in accordance with the present invention. To minimize turbulent gas flow inside the groove, it will be appreciated that any one of the different gas-diffusing structures disclosed above (e.g., coil springs, fine-mesh screens, braided rope, wire wool or porous walls) can be incorporated in the gas distribution tubes of the present invention, whether those tubes are used singly or as part of a multi-tube gas lance.

Furthermore, a filler metal guide nozzle can be incorporated in the center of any of the gas lances shown in FIGS. 4–11. Also, a filler metal guide nozzle can be interposed between one of the gas distribution tubes 64 and the adjacent edge of the electrode/stiffener 56 shown in FIG. 12. The provision of a filler metal guide nozzle which is structurally integral with a welding gas distribution tube or lance enables the depth of the joints which can be successfully completed to be increased well beyond the practical limit of conventional practices utilizing a flattened torch within the joint, or a flattened gas cup around the portion of electrode extending within the joint. This benefit can be achieved without resorting to the undesirable practice of increasing the width and corresponding volume of the joint. The gas lance can also be integrated with a compliant welding/cover gas dam to effect stable welding in very thin, high-aspect-ratio joint designs.

In accordance with further preferred embodiments shown in FIGS. 15A, 16A and 17A, an integrated gas distribution and filler nozzle assembly has filler positioning capability. The embodiment shown in FIG. 15A comprises a planar array of mutually parallel gas distribution tubes 74 joined in side-by-side relationship, except that a space for a filler wire 10 is left between two gas distribution tubes. The tubes 74 are held in place by a holder 116 of generally rectangular cross section. Each tube 74 has a coil spring section 76 attached to its end, which coil can be directed. The end of each coil spring is closed by a plug (not shown in FIG. 15A), which may be porous.

The filler wire 10 is vertically slidable in holder 116. The cross section of the opening which receives the filler wire is selected so that its limits lateral movement of the filler wire while allowing free downward sliding, as seen in FIG. 15B. After passage through the holder, the filler wire can be directed at an incline to a vertical axis by attaching a guide or deflecting block 124 to the end of an adjacent gas distribution tube. FIG. 15C shows a variant having gas distribution tubes and filler wire of smaller diameter than that shown in FIG. 15B.

The preferred embodiment shown in FIG. 16A comprises a planar array of mutually parallel tubes, including gas distribution tubes 74 attached to the holder 116 and a wire feed nozzle 118 which is slidable in the holder, as best seen in FIG. 16B. The wire feed nozzle 118 can be translated up or down so that the distal end of the nozzle is at a desired elevation. The end of wire feed nozzle 118 can be curved to guide the filler wire 10 toward the welding arc. The wire feed nozzle is also rotatable about a central axis. FIG. 16C shows a variant wherein the gas distribution tubes 74' have an elliptical cross section.

A further preferred embodiment, shown in FIGS. 17A and 17B, comprises a planar array of mutually parallel tubes, including gas distribution tubes 74 and a wire feed tube 122 held in side-by-side relationship by a plurality of welds 120. A filler wire feed nozzle 118 is slidable in the wire feed tube 122. The wire feed nozzle 118 can be translated up or down or rotated to direct the filler wire 10 toward a desired location. The end of wire feed nozzle 118 can be curved to guide the filler wire 10 toward the welding arc.

The apparatus and methods disclosed herein can be effectively used for both consumable and non-consumable electrode welding processes.

The foregoing preferred embodiments of the invention have been disclosed for the purpose of illustration. Variations and modifications of the disclosed method will be readily apparent to practitioners skilled in the art of welding. All such variations and modifications which do not depart from the concept of the present invention are intended to be encompassed by the claims set forth hereinafter.

We claim:

1. An apparatus comprising:

first and second components to be welded, said first and second components forming a groove;

a welding electrode having a blade and an electrode tip at an end of said blade, said electrode tip being located in the groove;

a filler material guide nozzle for guiding filler material to a location in the path of an arc from said electrode tip, said filler material nozzle having an outlet for the filler material at a distal end thereof, said outlet being located in the groove;

a gas distribution tube for distributing gas in the groove, said gas distribution tube having a tube axis and an elliptical outlet for gas at a distal end thereof, said outlet being oriented at an acute angle relative to said tube axis; and a fine-mesh screen structure comprising a circular cylindrical portion wrapped around a portion of said gas distribution tube including said outlet and a circular end portion joined to an end of said circular cylindrical portion.

2. The apparatus as defined in claim 1, wherein said gas distribution tube is joined to said filler material guide nozzle.

3. An apparatus comprising:

first and second components to be welded, said first and second components forming a groove;

a welding electrode having a blade and an electrode tip at an end of said blade, said electrode tip being located in the groove;

a filler material guide nozzle for guiding filler material to a location in the path of an arc from said electrode tip, said filler material nozzle having an outlet for the filler material at a distal end thereof, said outlet being located in the groove;

a gas distribution tube for distributing gas in the groove, said gas distribution tube having an outlet for gas at a distal end thereof, said outlet being located in the groove; and a coil spring having one end connected to said distal end of said gas distribution tube.

4. An apparatus comprising:

first and second components to be welded, said first and second components forming a groove;

a welding electrode having a blade and an electrode tip at an end of said blade, said electrode tip being located in the groove;

a filler material guide nozzle for guiding filler material to a location in the path of an arc from said electrode tip, said filler material nozzle having an outlet for the filler material at a distal end thereof, said outlet being located in the groove; and a gas distribution tube for distributing gas in the groove, said gas distribution tube having an outlet for gas at a distal end thereof, said outlet being located in the groove, wherein said gas distribution tube comprises a first porous wall having a relatively coarse-grade porosity and a second porous wall having a relatively fine-grade porosity, said first porous wall being nested inside said second porous wall.

5. An apparatus comprising:

first and second components to be welded, said first and second components forming a groove;

a welding electrode having a blade and an electrode tip at an end of said blade, said electrode tip being located in the groove;

a filler material guide nozzle for guiding filler material to a location in the path of an arc from said electrode tip, said filler material nozzle having an outlet for the filler material at a distal end thereof, said outlet being located in the groove;

a gas distribution tube for distributing gas in the groove, said gas distribution tube having an outlet for gas at a distal end thereof, said outlet being located in the groove; and a compliant gas dam located in the groove, wherein said compliant gas dam comprises a canted-coil spring filled with compliant material and a solid rod passing through said compliant material and extending along a portion of the length of said spring.

6. An apparatus comprising:

a flat electrode having a tip and a first edge;

a first gas distribution tube having an outlet for gas at a distal end thereof, said first gas distribution tube being joined to said first edge of said electrode by electrically insulating material.

7. The apparatus as defined in claim 6, wherein said electrode has a second edge, further comprising a second gas distribution tube having an outlet for gas at a distal end thereof, said second gas distribution tube being joined to said second edge of said electrode by electrically insulating material, said outlet being in the vicinity of said tip of said electrode, wherein said outlets of said first and second gas distribution tubes are both directed toward a region near said electrode tip.

8. An integral filler wire guide nozzle and gas distribution pipe comprising:

a gas inlet, a gas outlet, a channel connecting said gas inlet to said gas outlet, a filler wire inlet and a filler wire outlet, wherein said filler wire outlet is formed by an opening at a distal end of said pipe, and said gas outlet is formed by a circumferential opening in a section of said pipe removed from said distal end; and a fine-mesh screen covering said gas outlet wherein said filler wire outlet is designed to radially restrain a filler wire of constant cross section passing therethrough, and said channel having along its length a cross-sectional area greater than an area of said constant cross section of said filler wire.

9. A gas distribution system comprising:

a tube having a gas inlet, a gas outlet and a channel connecting said gas inlet to said gas outlet;

a conduit connected to said gas inlet; and a spring coil having one end connected to and in flow communication with said gas outlet of said tube; and an end cover connected to the other end of said spring coil.

10. The gas distribution system as defined in claim 9, wherein said end cover is gas-permeable.

11. An apparatus comprising:

first and second components to be welded, said first and second components forming a groove;

a welding electrode having a blade and an electrode tip at an end of said blade, said electrode tip being located in the groove;

a filler material guide nozzle for guiding filler material to a location in the path of an arc from said electrode tip, said filler material nozzle having an outlet for the filler material at a distal end thereof, said outlet being located in the groove; and a plurality of mutually parallel channels for distributing gas in the groove, each of said channels having an inlet, an outlet and an axis, said axes of said channels being generally coplanar and said outlets being located in the groove, wherein said channels are formed by drilling or machining a monolithic block of material having a non-circular cross section.

12. An apparatus comprising:

a planar array of mutually parallel tubes, including at least one gas distribution tube and a wire feed nozzle, each gas distribution tube having a coil spring section attached to its distal end which can be directed, each end of each coil spring being closed by a plug, and a distal end of said wire feed nozzle being curved; and a tube holder for holding said tubes in said array, each gas distribution tube being secured to said holder and said wire feed nozzle being slidable along and rotatable about its axis in said holder during wire feed nozzle position adjustment.

13. A gas lance comprising an internal support frame comprising a pair of support frames connected by a multiplicity of cross members, an external skin supported by and covering said internal support frame and defining an internal volume which is closed at a distal end thereof, and a gas inlet in flow communication with said internal volume away from said distal end, wherein said external skin encloses a volume having a noncircular cross section along the length of said lance and a distal section of said external skin is made of gas-permeable material.

14. A gas lance comprising a thin housing supported by a corrugated spine having corrugations running parallel to the gas lance axis, the peaks and valleys of said corrugations contacting the inner surface of said thin housing to provide support and to form a series of parallel channels for welding gas flow, wherein a distal section of said thin housing is gas-permeable.

15. A gas lance comprising a plurality of mutually parallel gas distribution tubes joined together in a side-by-side planar array, each gas distribution tube being contiguous along its length with an adjacent gas distribution tube and having a distal section which is made of gas-permeable material.

* * * * *